United States Patent [19]

Gallagher et al.

[11] 4,218,841
[45] Aug. 26, 1980

[54] ONE PIECE FISHING ROD BLANK FEATURING MOLDED IN EYELETS

[76] Inventors: Michael A. Gallagher, c/o George Spector 3615 Woolworth Bldg., 233 Broadway; George Spector, 3615 Woolworth Bldg., 233 Broadway, both of New York, N.Y. 10007

[21] Appl. No.: 934,841
[22] Filed: Aug. 18, 1978
[51] Int. Cl.² ............................................. A01K 87/04
[52] U.S. Cl. ....................................................... 43/24
[58] Field of Search ..................... 43/18 R, 18 GF, 24

[56] References Cited

U.S. PATENT DOCUMENTS

| 816,827 | 4/1906 | Skene | 43/24 |
|---|---|---|---|
| 1,409,282 | 3/1922 | Conoley | 43/24 X |
| 2,296,174 | 9/1942 | Meisler | 43/24 |
| 2,324,429 | 7/1943 | Rondelli | 43/18 R |
| 3,088,239 | 5/1963 | Weaver | 43/18 R |
| 3,171,227 | 3/1965 | Merrill | 43/24 X |
| 3,862,509 | 1/1975 | Petersen | 43/24 |
| 4,027,419 | 6/1977 | Popeil | 43/24 |

Primary Examiner—Nicholas P. Godici

[57] ABSTRACT

A fishing rod which is made in one piece of molded plastic so to include the row of eyelets which heretofor have been separately made and attached thereto, the present invention in one design thereof having the eyelets made with a longitudinal groove under an angular transverse cross-bars so to produce acute and obtuse corners through which the fishing line can selectively be positioned for either braking or friction free running-out of the line from the rod.

2 Claims, 9 Drawing Figures

U.S. Patent  Aug. 26, 1980  4,218,841
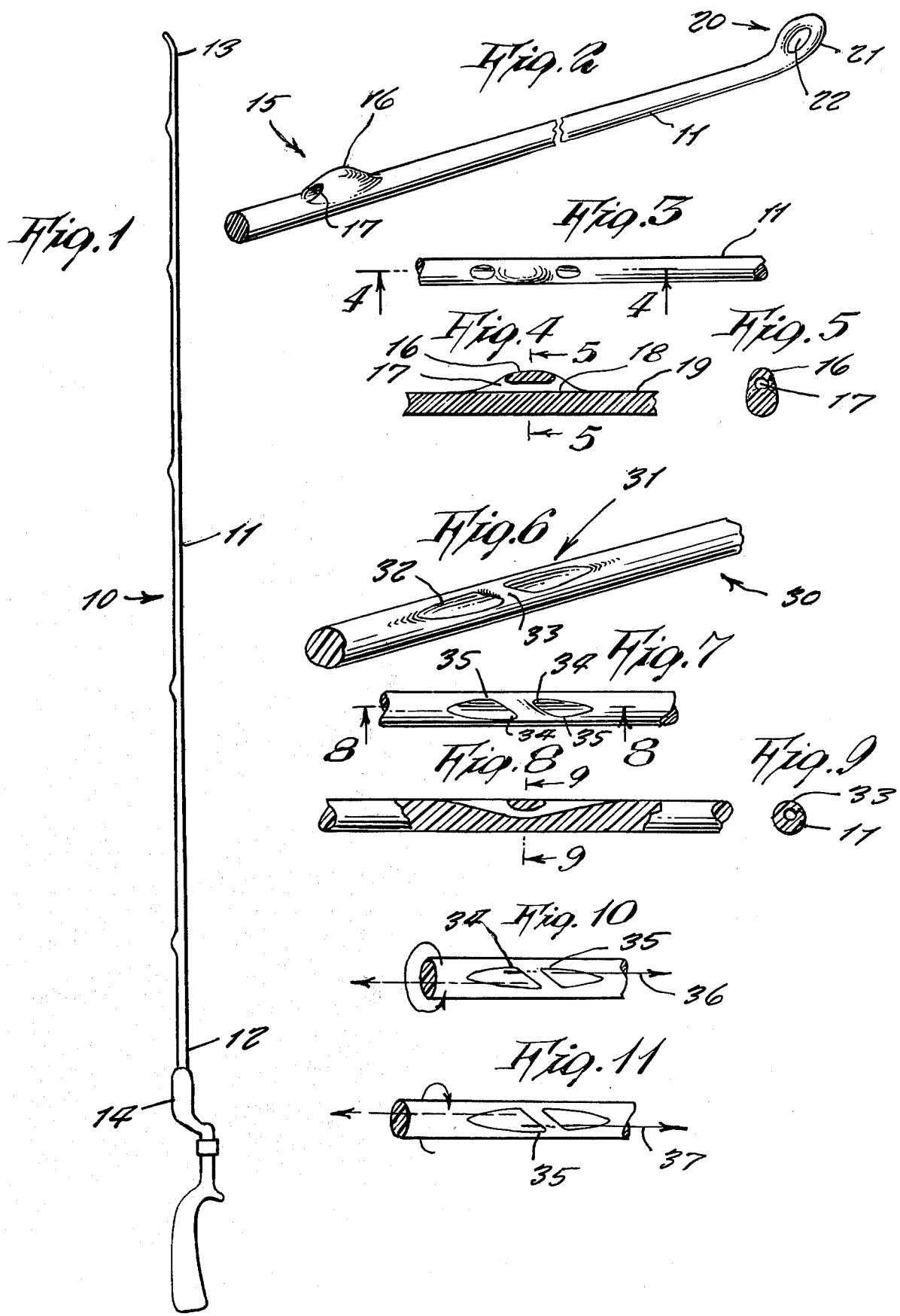

ONE PIECE FISHING ROD BLANK FEATURING MOLDED IN EYELETS

This invention relates generally to fishing rods.

It is well known that fishing rods are now conventionally made by securing a row of spaced apart eyelets along the rod and through which the fishing line extends between the line reel and the pole tip. These eyelets are usually attached by a wrapping of strong cord. This manufacture is time consuming so to increase production cost.

A principal object of the present invention is to provide a fishing rod made of a plastic material with the eyelets molded therein, so to comprise a one piece construction that is less costly.

Another object is to provide a one piece fishing rod which eliminates the problem of broken and unravelled cord wrappings, and the resultant need to repair the same.

Another object is to provide a one piece fishing rod which eliminates the problem of metal eyelets rusting out due to frequent contact with the wet fishing line.

FIG. 1 is a side view of a fishing pole incorporating the present invention.

FIG. 2 is an enlarged fragmentary perspective view thereof.

FIG. 3 is a top view thereof.

FIG. 4 is a cross section on line 4—4 of FIG. 3.

FIG. 5 is a cross section on line 5—5 of FIG. 4.

FIGS. 6 through 9 show views correspondingly similar to FIGS. 2, 3, 4 and 5 respectively and showing a modified design of the invention in which the eyelets are made flush with the pole surface.

FIGS. 10 and 11 are diagrams of the design illustrated in FIGS. 6 to 9, and showing how a slight turn to one side allows the line to slide friction-free through the eyelets in one direction, and a slight turn to the other side allows the line to be more frictionally held through the eyelet in one direction, so to aid in controlling the pay out of the line or holding it as wished.

Referring now to the drawing in greater detail, and more particularly to FIGS. 1 through 5 thereof at this time, the reference numeral 10 represents a fishing rod according to the present invention which is molded in one piece from a plastic material having a similar amount of rigidity or flexibility as a conventional fishing rod made of bamboo or other conventionally used material. The rod 10 includes accordingly a straight, long pole 11 which tapers throughout its length from a base 12 to a tip 13. The base is secured in a handle 14 on which a reel (not shown) can be secured in a usual manner.

In the present invention, a row of longitudinally spaced apart eyelets 15 are molded in the pole at a same time when the pole is molded, each eyelet including a raised protrusion 16 on the side of the pole and a longitudinal opening 17 extending through the protrusion, with a side surface 18 of the opening being aligned flush with the pole surface 19.

An endmost eyelet 20 at the pole tip comprises a circular loop 21 angularly inclined respective to a longitudinal axis of the pole. A hole 22 extends therethrough.

The protrusions 16 are rounded and blend at their edges with the pole surface so that no fishing line can hook around the outer side thereof, nor with the rod get hooked up in any bushes or brush as it is pulled therethrough when carried to a woodland stream.

In FIGS. 6 through 11, a modified design of one piece fishing 30 is a same as rod 10 except that the above described eyelets 15 are substituted by eyelets 31 which are made by a longitudinally extending groove 32 and extending accurately downwardly into the body of the pole 11 so to pass under a transverse extending arch or cross-bar 33 the outer side of which is flush with the generally cylindrical surface of pole adjacent each eyelet.

The cross-bar extends transversely at a diagonally inclined angle, as clearly evident in FIG. 7. All the eyelets along the side of the pole have the cross bar diagonal incline in a same parallel direction. The diagonal angle of the cross bar results in an obtuse corner 34 and an acute corner 35.

Accordingly, in operative use when a fishing line is inserted through the row of eyelets 31, the line is passed under the cross bars 33.

When a fishing line is intended to be cast out, the rod is turned in the hand, so that the line passed through the obtuse corners 34 in order to be relatively more friction free, as shown by arrow 36 in FIG. 10

When a fishing line is to be braked such as against the action of a lugging fish, the rod is turned in an opposite direction so the line moves through the acute corners 35 so to brake the line as shown by arrow 37 in FIG. 11.

We claim:

1. A one piece fishing rod, comprising in combination a tapering pole having a base end fitted in a handle, and a plurality of spaced apart fishing line eyelets located along a side of said pole and an end-eyelet at said tip, said pole and eyelets being molded from a single piece of plastic, each said eyelet including a longitudinally extending opening under a diagonal cross bar, providing opposing obtuse and acute angles.

2. The combination of claim 1 wherein said cross bar is flush with a surface of said pole, and said opening is formed downward arcuately in the body of said pole.

* * * * *